United States Patent [19]

Rosnack et al.

[11] Patent Number: 5,049,264

[45] Date of Patent: Sep. 17, 1991

[54] PROCESS AND APPARATUS FOR CONTINUOUSLY REMOVING CONTAMINANTS FROM EDIBLE COOKING OIL

[75] Inventors: Ellen M. Rosnack, Virginia Beach; Larry A. Pray, Suffolk; Alger C. Marable, Virginia Beach; Gerry C. Zekert, Suffolk, all of Va.

[73] Assignee: Nabisco Brands, Inc., Parsippany, N.J.

[21] Appl. No.: 406,786

[22] Filed: Sep. 13, 1989

Related U.S. Application Data

[62] Division of Ser. No. 205,215, Jun. 10, 1988, Pat. No. 5,008,122.

[51] Int. Cl.$^5$ .............................................. B01D 21/26
[52] U.S. Cl. .................................... 210/117; 210/136; 210/167; 210/512.1; 210/DIG. 8; 99/408
[58] Field of Search ..................... 99/408; 134/111; 210/194, 198.1, 360.2, DIG. 8, 117, 136, 167, 512.1; 426/417; 494/43

[56] References Cited

U.S. PATENT DOCUMENTS

| | | | |
|---|---|---|---|
| 1,567,989 | 12/1925 | Apablasa | 210/136 |
| 1,754,119 | 4/1930 | Pink | 210/117 |
| 2,578,129 | 12/1951 | Daugherty | 210/167 |
| 3,100,747 | 8/1963 | Hall | 210/167 |
| 3,210,193 | 10/1965 | Martin | 99/408 |
| 3,231,390 | 1/1966 | Hoover | 426/417 |
| 3,259,521 | 7/1966 | Crall | 99/408 |
| 3,346,391 | 10/1967 | Miller et al. | 426/417 |
| 3,356,218 | 12/1967 | Grudoski | 210/DIG. 8 |
| 3,368,682 | 2/1968 | Boots | 210/167 |
| 3,608,472 | 9/1971 | Pelster et al. | 210/167 |
| 3,750,560 | 8/1973 | Holmes | 99/408 |
| 3,947,602 | 3/1976 | Clewell et al. | 426/417 |
| 4,113,617 | 9/1978 | Bereskin et al. | 210/DIG. 8 |
| 4,195,667 | 4/1980 | Moore et al. | 99/408 |
| 4,362,620 | 12/1982 | High | 494/43 |
| 4,462,915 | 7/1984 | Friedman | 99/408 |
| 4,580,549 | 4/1986 | Sato | 126/391 |
| 4,684,412 | 8/1987 | Fritzsche | 99/408 |

*Primary Examiner*—Philip R. Coe
*Assistant Examiner*—Mark Spisich

[57] ABSTRACT

In accordance with the present invention a process and apparatus for removing contaminates from edible cooking oil is provided. A continuous stream of cooking oil at an elevated temperature is withdrawn from a cooking bath. A continuous stream of liquid solvent for at least a portion of the contaminates is mixed with the oil. The solvent has a specific gravity different than the specific gravity of the oil. As the oil and solvent streams are mixed, at least a portion of the contaminates are transferred from the oil to the solvent. The oil and solvent mixture is then separated by specific gravity into a stream comprising cleaned oil and a stream comprising solvent and contaminates. The cleaned oil stream is then returned to the bath, preferably being heated in a heat exchanger prior to introduction in the bath.

6 Claims, 2 Drawing Sheets

PROCESS AND APPARATUS FOR CONTINUOUSLY REMOVING CONTAMINANTS FROM EDIBLE COOKING OIL

This is a divisional of copending application Ser. No. 205,215 filed on June 10, 1988, now U.S. Pat. No. 5,008,122.

BACKGROUND OF THE INVENTION (1) Field of the Invention

The present invention relates to a process and apparatus for removing contaminates from edible cooking oil. More particularly, the present invention relates to a process and apparatus for continuously withdrawing a continuous stream of hot edible cooking oil from a cooking bath, removing at least a portion of contaminates in the cooking oil and thereafter returning the cleaned cooking oil to the bath.

The present invention also relates to a process for cooking comestibles such as nuts in an edible oil bath and continuously maintaining the quality of oil in the bath during the cooking process by withdrawing a continuous stream of the oil, cleaning the oil and returning it to the bath.

(2) Description of the Prior Art

During the cooking of comestibles in oil, and in particular in the cooking of snack foods in oil, the cooking oil becomes contaminated with substances transferred from the comestibles being cooked into the hot oil.

In the processing of edible nuts which are conventionally packaged and sold as snack-type products, nuts such as peanuts, cashews, almonds, walnuts, filberts, macadamia nuts, pecans and the like are coated with sugars and/or adhesive solutions for adhering the sugars to the nut. These sugars may comprise sucrose, corn syrup, honey, fructose or any number of sugars used in the coating of nuts and are transferred to the oil bath during oil roasting of the coated nuts. In addition, an adhesive, particularly a carbohydrate adhesive, may be used to adhere the sugars to the coated nut during roasting, and gum may be transferred to the oil bath during or roasting of the nuts.

The coated nuts are roasted at process temperatures of between about 250° and about 400° F. During roasting the coating comprising sugar will become tacky and some of the coating will transfer to the oil. As the coating particles are maintained in the oil, they will begin to carbonize and/or carmelize, thus contaminating the cooking oil. In a short period of time the oil becomes unsuitable for cooking nuts because the taste and coloration of the nuts falls outside of desired process standards. More particularly, the carbonized or carmelized sugar coating may adhere to the tack coated nuts as they move through the oil and the taste of the nuts is adversely affected. Moreover, the oil bath darkens to a point where the nuts produced are darkened outside of desired process standards.

In addition, the process equipment can become fouled with the carbon and/or carmelized sugar coating transferred to the oil during the cooking process. Thus, as the oil degrades, the entire system and production line must be shut down to clean the nut roasting apparatus and remove the cooking oil and replace it with additional cooking oil. The additional cooking oil must be reheated to process temperatures before the process can be started. The down time for cleaning and replacement of the oil is a substantial factor in the cost of the product. The output of the equipment is reduced substantially by contamination of the oil and fouling of the equipment, thereby increasing the need for additional lines, which in turn requires substantial capital expenditure. Moreover, during the course of the process, as the cooking oil degrades, the quality of the product varies over the life of a particular oil bath. The quality of the product may be inconsistent due to oil degradation.

The temperature of the oil during processing is between about 250° F. and 400° F. and is difficult to clean during the continuous cooking of the comestibles in the oil bath. In a conventional oil bath, the oil is continuously circulated through a mesh filter which screens some of the larger particulate matter. In a case where nuts including a coating comprising sugars are processed, the screen can become clogged. Even if the screen is not clogged, the oil still degrades due to the fine nature of the sugars, which pass through the mesh filter.

It would be desirable to maintain oil quality throughout the cooking process to thereby maintain a substantially uniform quality of the comestibles being cooked. It is also desirable to maintain the processing equipment in a clean condition. Through maintenance of the oil quality and maintenance of equipment in a clean condition, production can be increased or maximized by reducing process shutdown time. By reducing shutdown, the capacity of the equipment is increased, and the requirement for additional capital expenditures for additional equipment may, in some instances, be reduced or avoided.

SUMMARY OF THE INVENTION

In accordance with the present invention a process and apparatus for removing contaminates from edible cooking oil is provided. A continuous stream of cooking oil at an elevated temperature is withdrawn from a cooking bath. A continuous stream of liquid solvent for at least a portion of the contaminates is mixed with the oil. The solvent has a specific gravity different than the specific gravity of the oil. As the oil and solvent streams are mixed, at least a portion of the contaminates are transferred from the oil to the solvent. The oil and solvent mixture is then separated by specific gravity into a stream comprising cleaned oil and a stream comprising solvent and contaminates. The cleaned oil stream is than returned to the bath, preferably being heated in a heat exchanger prior to introduction in the bath.

In accordance with one aspect of the invention, the liquid solvent and the hot oil are mixed under a pressure sufficient to substantially inhibit vaporization of the liquid solvent which is preferably water. When the oil and solvent are mixed, the mixture has an elevated temperature which enhances the solubility of the contaminates in the solvent. In the instance where a contaminate is sucrose and the solvent is water the amount of sucrose which will dissolve in water having an elevated temperature is substantially greater. Moreover, it is believed that the dissolution of the sucrose is the water occurs more rapidly in water having an elevated temperature. These dissolution factors are advantageous in a process for continuously removing the sucrose from the oil. By maintaining the mixture at a pressure sufficient to substantially inhibit vaporization of the solvent, the mixing of solvent and hot oil in atmospheric conditions and the attendant vaporization and bubbling of the hot oil is avoided.

In accordance with one aspect of the invention, the mixture of oil and solvent is separated in of a centrifugal contactor which continuously receives the oil and solvent, and continuously separates the mixture into a stream of cleaned oil and a stream comprising solvent and contaminates.

In accordance with one aspect of the invention, after the oil has been separated from the solvent, trace amounts of solvent may still exist in the cleaned oil, and it is desirable to permit the oil to come to atmospheric pressure in a flash chamber to vaporize the solvent Thereafter, the cleaned oil is returned to the cooking bath, preferably through a heat exchanger that elevates the temperature of the oil to the bath temperature.

The quality of the oil is maintained through removal of the contaminates, and the cooking equipment is maintained in clean condition. The down time of the equipment is reduced substantially, and the standard of quality of the comestible product is maintained at a substantially uniformed level, and particularly at a quality level which is much more consistent than in a conventional process. The hot oil is safely cleaned by maintaining the pressure of the mixture of the cooking oil and solvent at a level sufficient to inhibit vaporization of the solvent. Thus, the danger of mixing hot oil with a solvent is substantially reduced or eliminated.

Additional advantages of a process and apparatus in accordance with the present invention will be described in the detailed description of the invention with reference to the drawings, and such description follows.

DETAILED DESCRIPTION OF THE INVENTION

Figure 1:
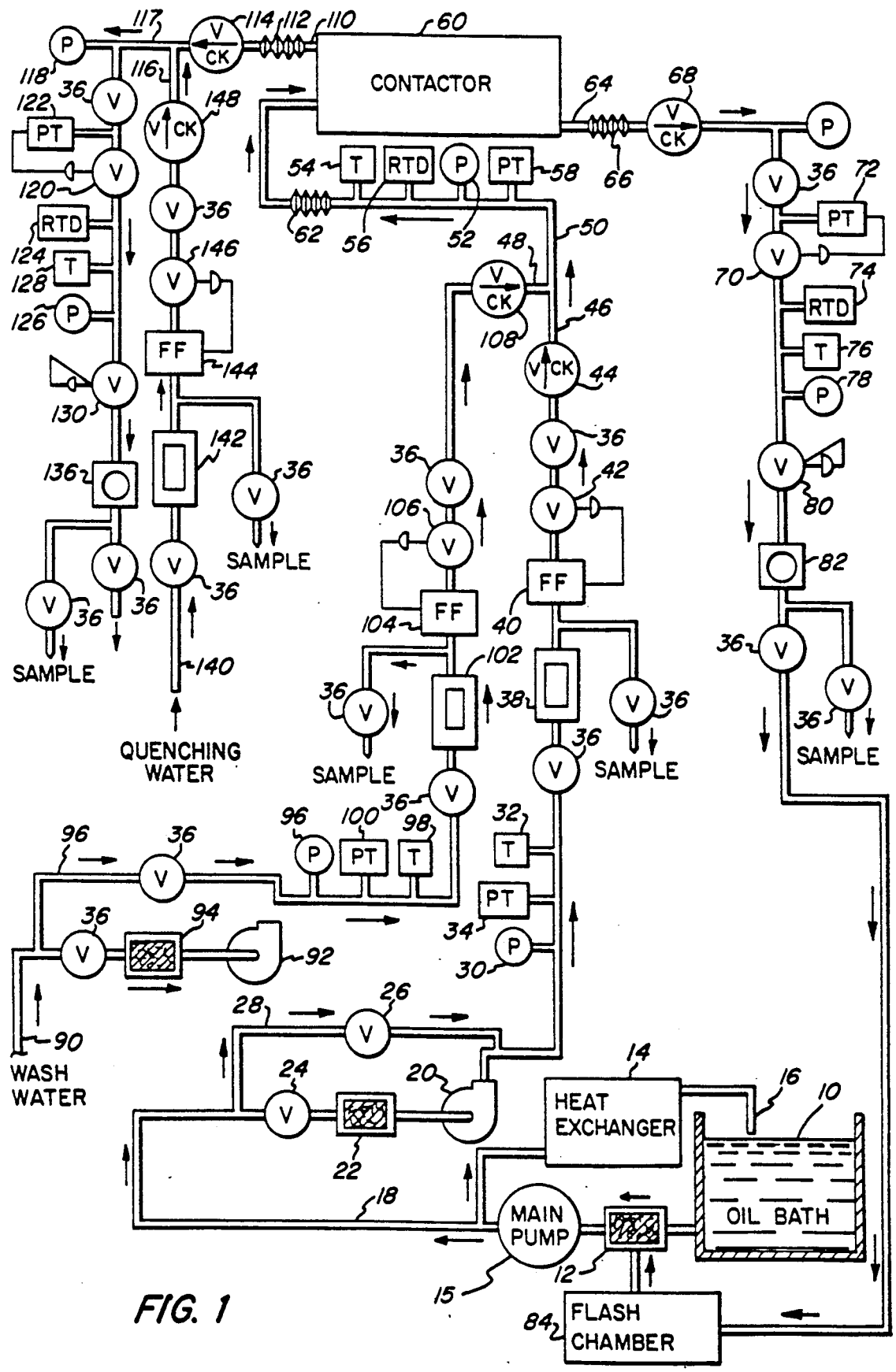
FIG. 1 is a schematic of an apparatus for continuously removing contaminates from cooking oil.

In accordance with the present invention, as shown in FIG. 1 comestibles are subjected to oil at an elevated temperature in oil bath 10. The cooking operation can be conducted on a batch or a continuous basis in an oil bath 10. In the case of a continuous oil roasting operation for oil roasting of nuts, a continuous web of wire mesh fabric from stainless steel or the like and transported on a continuous basis moves through the bath 10. Contaminates from the comestible are transferred to the oil bath.

Oil is withdrawn from the oil bath 10 and passed through a conventional screen 12 which removes large particles, pieces of comestibles and other objects larger than the openings in the screen. The main pump 15 circulates oil through a heat exchanger 14 which maintains the temperature of the oil at a desired level. Oil which has passed through the heat exchanger 14 is then returned to the oil bath 10 through conduit 16.

Contaminated oil is withdrawn through conduit 18 by a centrifugal pump 20 which pulls the contaminated oil through a strainer 22. Manual valves 24 and 26 permit the user to decide whether to direct the contaminated oil through the centrifugal pump 20 or through a parallel conduit 28 which permits the oil to be pumped under the power of the main pump 15 rather under the power of the centrifugal pump 20. The pressure and temperature of the oil are monitored by pressure gauge 30 and temperature gauge 32. A pressure transducer 34 permits the pressure to be monitored by electrical means and fed into computing apparatus, not shown, which may control the entire system.

At various stages of the process, manual valves are positioned in the conduits so that flow may be controlled or stopped at any point along the process. The manual control valve is indicated by a particular symbol, (v) and manual control valves will hereinafter be given reference character 36.

The contaminated oil flows through a rotameter 38 which measures the volume flow rate of the oil passing through the conduit Thereafter, the oil moves through a fluid flow control valve 40 which measures the volume flow of fluid therethrough and adjusts a control valve 42. A check valve 44 permits flow of the contaminated oil in a single direction. The oil conduit 46 is joined with a conduit 48 which supplies the solvent for the contaminates.

The oil/solvent mixture passes through conduit 50. The pressure and temperature of the mixture is measured by pressure and temperature gauges 52 and 54. A resistance temperature device 56 and a pressure transducer may be used and connected to a computing system. Because contactor 60 vibrates, the conduit 50 is connected to the contactor 60 via a flexible conduit 62.

The contactor 60, which will be described in detail hereinafter, separates the oil and solvent mixture into a stream comprising cleaned oil and a stream comprising solvent and contaminates. As will be described in detail, the contactor separates the oil and the solvent by gravity separation. The cleaned oil exits the contactor via conduit 64 and flows through a flexible conduit 66, a one-way check valve 68, a manual valve 36, and a control valve 70 which is controlled by a pressure transducer 72. The cleaned oil conduit also includes a resistance temperature device 74, a temperature gauge 76 and a pressure gauge 78. A pressure control valve 80 is positioned in the conduit for regulation of the pressure. The cleaned oil flows through a sight glass 82, through a manual valve 36 and then to a flash chamber 84. Once the oil reaches the flash chamber, the pressure of the cleaned oil is permitted to reach atmospheric pressure, and trace amounts of solvent are vaporized. The cleaned oil is then returned to a screen 12 which enters the loop of the oil bath. The cleaned oil is mixed with oil from the bath at the screen and then pumped once again through main pump 15.

The conduit for supplying the solvent to be mixed with the oil will now be described. Preferably, the solvent comprises washwater 90 introduced from a common source of water. The tap water is preferably at room temperature and proceeds through manual valves 36 through either a centrifugal pump 92 which pulls the water through a screen 94 or through a parallel line 96 which is supplied under the pressure of tap water. The pressure and temperature of the water is measured by gauges 96 and 98. Also, a pressure transducer 100, measures the pressure of the water and communicates such pressure to a computing mechanism. The water then passes through a rotameter 102 and a fluid flow meter 104 which controls a control valve 106. The water then passes through a manual valve 36 and check valve 108 and is thereafter mixed with the stream of oil. It should be understood that the oil and water are mixed by a confluence of conduits 46 and 48 which merge into conduit 50. It is also possible to mix the oil and water streams in a separate mixing chamber provided.

As mentioned previously, the contactor 60 separates the mixture of oil and solvent into a cleaned oil stream which leaves the contactor through conduit 64 and a stream of solvent and contaminates which leaves the contactor through a conduit 110. The solvent and contaminate mixture passes through a flexible conduit 112 and a one-way check valve 114.

If desired, the temperature of the water with contaminates can be reduced by mixing an additional quenching water through conduit 116. The water which has been quenched passes through conduit 117 where its pressure is measured by gauge 118. The water passes through a manual valve 36 and through a check valve 120 which is controlled by a pressure transducer 122. The water temperature is tested by a resistance temperature device 124. The pressure and temperature of the water is measured by gauges 126 and 128. The water than flows through a pressure control valve 130 the water moves through a sight glass 132 and is discharged by a valve 36 which may be manually controlled.

At various locations in the apparatus, the sample of the fluid may be removed via a conduit labeled sample and controlled by a manual control valve 36.

The quenching water conduit 140 supplies quenching water through a valve 36, a rotameter 142 and a flow meter 144 which controls control valve 146. The water passes through a manual valve 36 and through a one-way check valve 148 into conduit 116 and is in turn mixed with water at an elevated temperature which comes from contactor 60.

Figure 2:
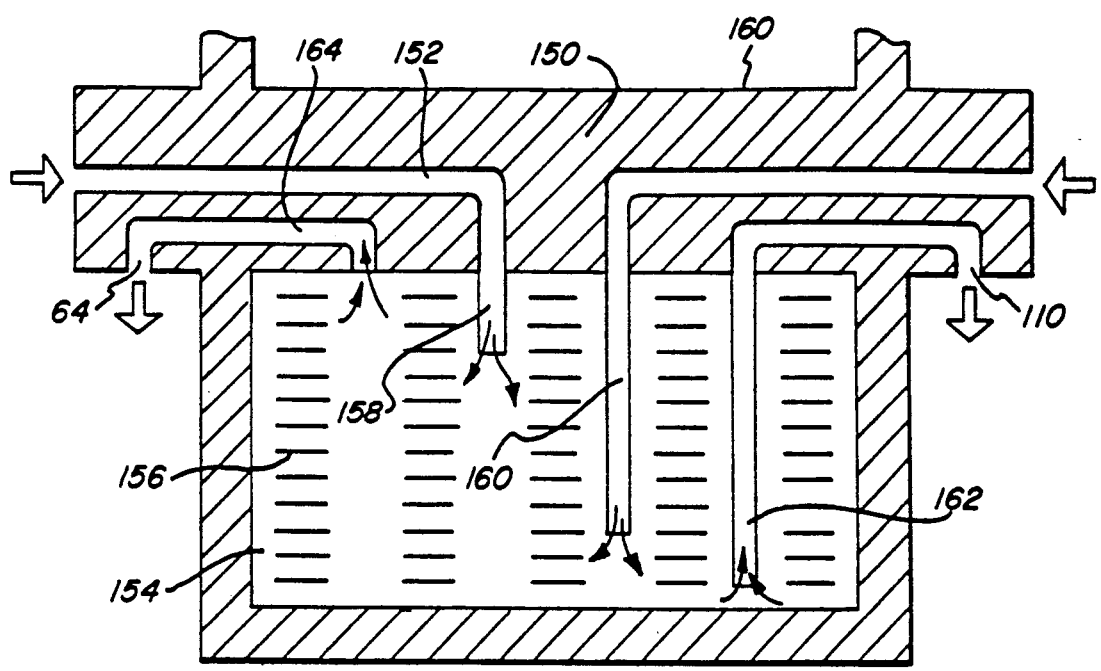
FIG. 2 is a sectional view of a portion of a centrifugal contactor.
Figure 3:
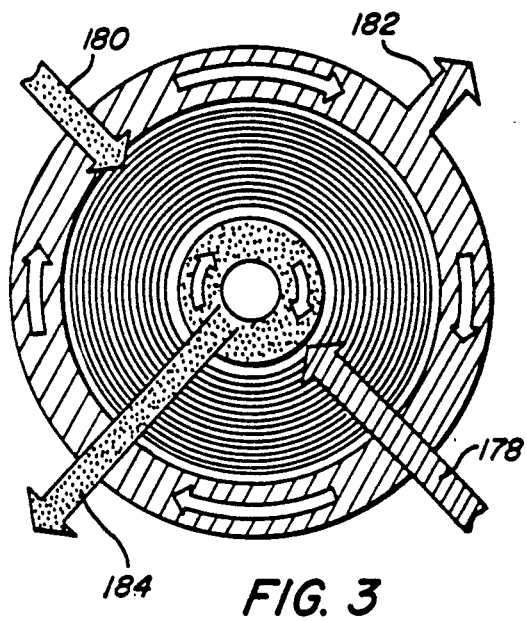
FIG. 3 is a sectional schematic view of the centrifugal contactor shown in FIG. 2 wherein an oil stream and a solvent stream are separately introduced into the centrifugal contactor.
Figure 4:
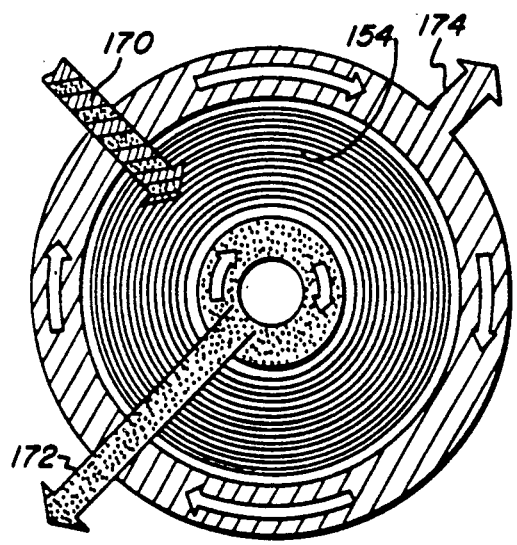
FIG. 4 is a sectional schematic view of the centrifugal contactor shown in FIG. 2 wherein a stream comprising a mixture of the oil stream and the solvent stream is introduced into the centrifugal contactor.

Referring to FIGS. 2-4, the centrifugal contactor utilized in the equipment and process of the present invention and is a conventional centrifugal separating device such as that described in "Advances In Centrifugal Extraction", *Chemical Engineering Progress*, (Volume 61, No. 5, May, 1965; "Multiple Functions In A Centrifgual Extractor", *Chemical Engineering Progress*, (Volume 62, No. 8, August, 1966); and, "Improving Performance of Centrifugal Extractors", *Chemical Engineering*, July 24, 1972. Essentially, the contactor includes a means for placing liquids having different specific gravities in the contactor, rotating the contactor at relatively high speeds, and separating the liquid having a higher specific gravity from a liquid having a lower specific gravity. A conventional contactor, as shown in FIG. 2, includes a body 150 which rotates about an axis 152. The contactor includes an internal chamber 154 having a plurality of baffles 156 for separating and mixing the liquid in the chamber 154. The contactor includes two inlet ports 158 and 160. The contactor also includes an exit port 162 for relatively heavy liquids and has an exit port 164 for relatively light liquids. In the case of the contactor shown in FIG. 1, only one inlet port is used because the oil and solvent are mixed prior to introduction into the contactor.

During the course of operation of the contactor, the oil, which has a specific gravity less than water, exits through exit port 164 whereas the water exits through port 162. The port 162 corresponds to conduit 110 in FIG. 1. The exit port 164 corresponds with conduit 64 in FIG. 1.

As shown schematically in FIG. 4, the oil and the water mixture 170 is directed into cavity 154. As the contactor rotates, the oil is driven to the interior of the chamber 154 and through an outlet port. The cleaned oil is indicated at reference character 172. The solvent containing contaminates is heavier and moves to radially outwardly. The solvent and contaminates are indicated at 174.

Referring to FIGS. 2 and 3, an alternative form of the invention is shown wherein the water 178 is introduced through conduit 158 and the oil 180 is introduced through conduit 160. The contactor serves not only as a separator but also as a contactor and mixer. As the oil moves through the water, the contaminates and the oil are transferred to the water and preferably become soluble in the water. The water and contaminates exit through exit port 162 to provide a stream of contaminated solvent 182. The cleaned oil stream exits through port 164 to provide a cleaned oil stream 184.

As can be appreciated from reviewing FIGS. 1-4, the oil at an elevated temperature is maintained at a pressure above atmospheric pressure when it is mixed with the water, during separation in the contactor, and during egress from the contactor until the cleaned oil reaches a flash chamber, where trace of amounts of the water can be safely vaporized from the oil.

A process for roasting nuts in accordance with the present invention will now be described in greater detail so that the advantages of a system according to the present invention can be understood. First, it is necessary to describe the process for preparing the nuts prior to roasting. The comestibles which are processed in accordance with the invention can be any food which is roasted, fried or otherwise cooked in hot oil and, in particular, edible nuts which are conventionally packaged and sold as snack-type products or which are utilized for decoration and as fillers in the confectionery and baked foods industry. Illustrative of such nut-meats are peanuts, cashews, almonds, walnuts, filberts, macadamia nuts, pecans, and the like. Particularly preferred products provided in accordance with the invention are those derived using peanuts and cashews as the starting materials.

The nuts are deshelled in a preliminary step and, optionally, may also be subjected to other conventional procedures such as blanching and the like prior to being subjected to the process of the invention. The term "raw nuts" is used hereinafter to refer to nuts in the form in which they are subjected to the first step of the process of the invention irrespective of what preliminary treatment, if any, has been applied to the nuts. Thus, nuts which have been subjected to a process to remove a portion of their fat content are included within the meaning of this term.

The raw nuts are subjected to coating with an adhesive solution containing honey. The nut products prepared according to the present invention are, thus, honey-roasted because it is this adhesive solution containing honey which actually transfers the heat to the nuts to effect roasting, whether the coated nuts are roasted by immersion in oil (oil roasting) or by air convection (dry roasting).

The coating is accomplished in a conventional coating drum. The nuts are introduced into the drum and an appropriate amount of the adhesive solution is introduced while providing agitation by rotating the drum at an appropriate speed until the nuts are uniformly coated with a layer of the adhesive solution. Alternatively, and preferably, particularly when the process is carried out on a continuous basis as described more fully hereafter, the nuts and the adhesive solution are introduced simultaneously in the appropriate proportions, and rotation of the drum is carried out as before until uniform coating is achieved. In general, the adhesive solution is employed in a proportion in the range of about 5 parts by weight to about 10 parts by weight, and preferably in the range of about 6 parts by weight to about 8 parts by weight, per 100 parts by weight of nuts.

The adhesive solution preferably comprises a mixture of honey, corn syrup, sucrose, a carbohydrate gum and water. Advantageously, the proportion of these components lies within the following ranges (all percentages by weight of total mixture).

Honey: 10 to 40 percent
Corn Syrup: 10 to 40 percent
Sucrose: 10 to 40 percent
Water: 10 to 20 percent
Carbohydrate Gum: 0 to 1.0 percent The percentage of water expressed above and hereafter is preferably the proportions of the above components lie within the following ranges of percentages by weight:

Honey: 25 to 30 percent
Corn Syrup: 25 to 30 percent
Sucrose: 25 to 30 percent
Water: 12 to 16 percent
Carbohydrate Gum: 0.05 to 0.20 percent In a particularly preferred embodiment the proportions in percentages by weight of the honey, corn syrup and sucrose are substantially identical and are of the order of about 27 to 29 percent by weight, the balance of the adhesive solution being water.

Other optional additives may be present in the adhesive solution in minor amounts, generally less than about 10 percent by weight of the total solution. Illustratively, natural or derived carbohydrate gums such as xanthan gum, gum arabic, guar gum, locust bean gum and the like can-be present in the adhesive solution in amounts up to about 1.0 percent by weight. Preferably, xanthan gum will be employed at a level of about 0.10 to 0.14 percent.

The adhesive solution is preferably prepared by first preparing an aqueous mixture of the xanthan or other gum and then blending this with the honey and corn syrup and the sucrose, preferably in the form of a fruit granular grade. The resulting mixture is then heated with agitation to a temperature of the order of about 150° F. to about 180° F. and preferably about 160° F. to about 170° until complete solution is achieved. If desired, the heating of the syrup can be continued at a sufficiently high temperature to remove some of the water and increase the viscosity and or specific gravity of the adhesive solution to any desired value. Advantageously, the viscosity of the adhesive solution is within the range of about 1200 to about 1800 cps as measured on a Brookfield RVT helipath viscometer using a number 1 spindle. The specific gravity of the adhesive solution is advantageously within the range of about 1.27 to about 1.28.

After the nuts have been uniformly coated with the adhesive solution the manner described above, they are then subjected to a second coating operation in which they are enrobed with dry particulate sugar. This coating can be applied using conventional coating means such as the coating drum described above in regard to the first coating step. Indeed, the second coating operation can be carried out immediately after the first coating operation is completed and while the nuts are still present in the coating apparatus employed therefor.

The two coating operations may be carried out sequentially in a single coating drum which is inclined and/or provided with means such as a helical auger for advancing the nuts along the length of the drum as the latter is rotated. The adhesive solution is applied to the nuts in a first zone of such a device and after the nuts have been uniformly coated, the dry granular sugar is introduced in a second zone of the device. The residence time of the nuts in such a coating device is adjusted, advantageously by adjusting the speed of rotation of the drum and the propulsion means, so as to provide adequate time for each coating to be accomplished uniformly and completely.

Any of the commonly used forms of granulated sugar can be employed in this second coating step. Illustrative of such sugars are number X powdered sugar. Advantageously, the sugar employed preferably has an average particle size from about 40 to about 140 US mesh.

The dry granular sugar is applied to the adhesive coated nuts in a proportion which is advantageously in the range of about 6 to about 12 parts per 100 parts by weight of nuts, and preferably within the range of about 8 to about 10 parts per 100 parts by weight of nuts.

When the second coating operation has been completed, the coated nuts are roasted in an edible oil such as refined peanut oil at a temperature in the range of about 300° F. to about 330° F., preferably from about 315° F. to about 325° F., and for a time which will vary depending upon the particular type of nut being processed and upon the temperature of roasting and the degree of roasting desired Illustratively, the time and extent of roasting will be greater in the case of peanuts (from about 4.5 to about 7 minutes) than in the case of cashews (from about 1.5 to about 3.5 minutes). The most appropriate roasting conditions to be adopted in any particular instance can be determined readily by a process of trial and error.

The roasting operation can be conducted on a batch or continuous basis. Referring to FIG. 1, in the case of continuous oil roasting operation the nuts are retained on a continuous web of wire mesh fabricated from stainless steel or the like and transported on a continuous basis through a bath 10 of the edible oil heated to a temperature within the range set forth above. The residence time of the nuts in the bath is adjusted to provide the desired time of roasting. The roasted nuts, Whether roasted on a continuous or batch basis, are then passed to the final coating stage of the process of the invention. Preferably, any excess oil remaining on the nuts after the roasting step has been completed is allowed to drain off before subjecting the roasted nuts to this final coating stage.

During roasting, the combined coating on the nuts will become tacky and this tackiness is used to advantage to adhere a final coating mixture to the nuts. In the final coating stage, a dry mixture of sucrose and salt is applied to the nuts to provide a uniform coating thereon. This operation is accomplished using any conventional coating means, such as those described above, and is carried out in a continuous or in a batch procedure, preferably, shortly after the roasting step.

The dry mixture employed in this coating operation advantageously comprises from about 2 to about 3 parts, and preferably about 2½ parts by weight of sucrose to each part of salt. Any of the forms of sucrose available commercially can be employed. Sucrose of the grade known as fruit granular has been found to be particularly adapted for use in the dry mixture employed in this stage. The salt is also preferably of fine granulation, the grade known as flour salt being suitable. The dry mixture advantageously has a particle size of about 40 US mesh to about 140 US mesh.

The proportions in which the dry mixture of sucrose and salt are applied in this final coating step are advantageously in the range of about 4 parts to about 6 parts and preferably from about 5.0 parts to about 5.5 parts by weight per 100 parts by weight of nuts.

When the final coating operation has been completed the resulting coated and oil roasted nuts are cooled or allowed to cool, if necessary, to ambient temperature and then packaged in any appropriate manner for delivery to the ultimate consumer.

As can be appreciated, during the roasting, a portion of the coating is transferred into the oil bath and contaminates the bath. Also as can be appreciated, in a conventional continuous roasting operation, the nuts are retained on a continuous mesh fabricated from stainless steel, and the mesh may become clogged with materials from the coating. In a conventional roasting operation, it is necessary to maintain the surface color of the nuts at a reasonably uniform level. More specifically, as the nuts are processed in accordance with the prior art process, as the oil bath becomes contaminated with carbonized coating and/or carmelized coatings, the surface color of the nuts degrades to a point where the product is no longer satisfactory. Such degradation can occur within as little as four hours of processing time. If the bath reaches a level of contamination wherein the surface color of the nuts is no longer acceptable, the entire bath must be emptied and cleaned, requiring a substantial down time. In accordance with a process of the present invention, it has been found that the surface color of the nuts can be maintained at a consistent level for an excess of 18 hours, thereby lengthening the life of the oil bath. One of the benefits of a process in accordance with the present invention, is that the nuts have a surface coloration which is within consistent desirable ranges. Moreover, the useful life of the bath is much longer than previously obtained, and the processing equipment has substantially more production capability because of the reduced down time. In addition, substantial resources are saved because the equipment does not become fouled during operation.

In accordance with one aspect of the invention, it is particularly preferred that the solvent for the contaminates in the oil be conventional tap water. However, it should be understood that if desired, additives can be placed in the water to extend the life of the bath. In particular, and on occasions, it is a concern that the oil may become rancid, and may be desirable to add to the solvent alkali that removes fatty acids formed during cooking. Other additives can be added to the water and/or oil if desired.

The solvent and oil are preferably blended so that the solvent comprises between about five and about thirty volume percent solvent However, it should be understood, that the particular ratio of solvent to oil will be determined in the particular process for removal of contaminates. In accordance with the present invention, the oil at an elevated temperature from the bath has a temperature between about 250° F. and about 400° F., and has a pressure in the range of about 100 psig to 200 psig, preferably between about 120 to about 190 psig.

The washwater is furnished at room temperature, generally between about 60° and about 90° F., and has a pressure between about 100 and about 130 psig, preferably between about 115 to about 125 psig. The mixture of the water and oil has a pressure between about 80 and 115 psig and a temperature between 200° and 250° F. The cleaned oil after separation from the water has a temperature of between about 225° and about 240° F. and a pressure between about 60 and about 80 psig. The water has a temperature between about 150° and about 180° F. and a pressure of about 40 to 50 psig. However, it should be understood that the temperatures and pressures of the water and oil may vary depending upon the particular process and requirement to control flow rates through the contacter.

It should be understood that although specific embodiments of the invention have been described herein in detail, such description is for purposes of illustration only and modifications may be made thereto by those skilled in the art within the scope of the invention.

What is claimed is:

1. An apparatus for continuously removing contaminates from edible oil in the cooking bath having a temperature in excess of 250° F., comprising:

a pump for withdrawing a continuous stream comprising oil and contaminates from said bath, said pump directing said contaminated oil through a closed conduit to maintain said oil under pressure substantially in excess of atmospheric pressure;

a source of liquid solvent for at least a portion of said contaminates, said solvent comprising water and having a specific gravity different than the specific gravity of said oil;

means for generating a continuous stream of said solvent, said solvent stream being transferred through a conduit;

means for mixing said continuous contaminated oil stream and said continuous solvent stream to provide a continuous oil and solvent mixture stream, said mixture stream being maintained at a pressure substantially above atmospheric pressure to inhibit vaporization of said solvent;

a centrifugal separator for separating said oil and solvent mixture stream by specific gravity into a stream comprising cleaned oil and a stream comprising solvent and contaminates;

means for reducing the pressure of the cleaned oil stream to a pressure lower than the vaporization pressure of said solvent to permit any solvent remaining in the cleaned oil stream to vaporize;

means for returning said cleaned oil stream to said bath; and means for discarding said stream comprising solvent and contaminants.

2. An apparatus according to claim 1 and further including a check valve in said oil conduit, the pump and said check valve maintaining said oil stream at a pressure between about 100 and about 200 psig and at a temperature in excess of about 250° F., said means for generating a continuous stream of solvent comprising a pump for said solvent stream and a check valve in said solvent conduit to maintain said solvent stream at a temperature of between about 60° F. and about 90° F. and at a pressure between about 100 and 150 psig, and check valves located downstream of said separator for maintaining said mixture stream at a temperature between about 150° F. and about 250° F. and at a pressure between about 80 and 115 psig.

3. An apparatus according to claim 2 and further including control means for mixing said oil stream and said solvent stream in a volume flow ratio of between about 1% and 40% solvent.

4. An apparatus according to claim 3 wherein said volume flow ratio is between about 5% and about 30% solvent.

5. An apparatus according to claim 1 wherein said centrifugal separator has a central zone, said mixture being continuously introduced in said central zone, a port for removing said solvent stream form one of said zones, and a port for removing said oil stream from the other of said zones.

6. A process according to claim 1 wherein said centrifugal separator has a central zone, a radially inward zone and a radially outward zone, said oil stream being introduced in said outward zone, and said solvent being introduced in said inward zone, said cleaned oil being removed from said inward zone and said solvent being removed from said outward zone.

* * * * *